United States Patent
Jeong et al.

(10) Patent No.: US 11,581,551 B2
(45) Date of Patent: Feb. 14, 2023

(54) ELASTOMERIC CELL FRAME FOR FUEL CELL, MANUFACTURING METHOD OF THE SAME AND UNIT CELL USING THE SAME

(71) Applicants: HYUNDAI MOTOR COMPANY, Seoul (KR); KIA MOTORS CORPORATION, Seoul (KR)

(72) Inventors: Byeong-Heon Jeong, Seoul (KR); Jin Hyeok Yoo, Cheonan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 185 days.

(21) Appl. No.: 16/742,602

(22) Filed: Jan. 14, 2020

(65) Prior Publication Data

US 2021/0036341 A1 Feb. 4, 2021

(30) Foreign Application Priority Data

Aug. 2, 2019 (KR) .......................... 10-2019-0094149

(51) Int. Cl.
*H01M 8/0273* (2016.01)
*H01M 4/88* (2006.01)
(Continued)

(52) U.S. Cl.
CPC ....... *H01M 8/0273* (2013.01); *H01M 4/8807* (2013.01); *H01M 8/1004* (2013.01); *H01M 2008/1095* (2013.01)

(58) Field of Classification Search
CPC .................................................. H01M 8/0273
See application file for complete search history.

(56) References Cited

U.S. PATENT DOCUMENTS 5,434,700 A 7/1995 Yoo
5,464,700 A 11/1995 Steck et al.
(Continued)

FOREIGN PATENT DOCUMENTS

CN 102347503 A 2/2012
JP H07-501417 A 2/1995
(Continued)

OTHER PUBLICATIONS

U.S. Notice of Allowance dated Apr. 14, 2021 issued in U.S. Appl. No. 16/670,951.
(Continued)

*Primary Examiner* — Brian R Ohara
(74) *Attorney, Agent, or Firm* — Morgan, Lewis & Bockius LLP (57) ABSTRACT

An elastomeric cell frame for a fuel cell includes an insert which includes: a membrane electrode assembly including a polymer electrolyte membrane and a pair of electrode layers respectively disposed on opposite sides of the polymer electrolyte membrane; and a pair of gas diffusion layers disposed and bonded on upper and lower surfaces of the membrane electrode assembly, respectively. The insert further includes an elastomeric frame disposed in an external region of the insert. The elastomeric frame surrounds one of opposite edge surfaces of the insert and a side surface of the insert, the elastomeric frame being interface-bonded, through thermal bonding, to portions of the polymer electrolyte membrane and the electrode layers exposed at the one of opposite edge surfaces of the insert and the side surface of the insert.

13 Claims, 4 Drawing Sheets

(51) Int. Cl.
  *H01M 8/1004* (2016.01)
  *H01M 8/10* (2016.01)

(56) References Cited

U.S. PATENT DOCUMENTS

| | | | | |
|---|---|---|---|---|
| 8,685,588 B2* | 4/2014 | Yamada | ............... | H01M 8/0273 |
| | | | | 429/480 |
| 10,658,683 B2* | 5/2020 | Sugishita | ............ | H01M 8/0276 |
| 2002/0102453 A1 | 8/2002 | Suenaga et al. | | |
| 2004/0234831 A1* | 11/2004 | Kobayashi | ............ | H01M 8/242 |
| | | | | 429/510 |
| 2005/0014056 A1* | 1/2005 | Zuber | ................. | H01M 8/1004 |
| | | | | 429/456 |
| 2008/0118802 A1 | 5/2008 | Szrama et al. | | |
| 2009/0029230 A1 | 1/2009 | Shirahama | | |
| 2009/0087713 A1 | 4/2009 | Yoshida et al. | | |
| 2009/0162718 A1 | 6/2009 | Extrand | | |
| 2011/0311898 A1* | 12/2011 | Yamauchi | ............ | H01M 8/242 |
| | | | | 429/480 |
| 2012/0219874 A1* | 8/2012 | Suzuki | ................ | H01M 8/1018 |
| | | | | 429/480 |
| 2013/0157175 A1* | 6/2013 | Sohma | .................... | H01M 8/10 |
| | | | | 429/535 |
| 2013/0183604 A1* | 7/2013 | Tanaka | ................ | H01M 8/0273 |
| | | | | 429/480 |
| 2013/0302722 A1 | 11/2013 | Boucher et al. | | |
| 2014/0234749 A1* | 8/2014 | Tanaka | ................ | H01M 8/0273 |
| | | | | 429/481 |
| 2014/0287339 A1* | 9/2014 | Mitsuta | ............... | H01M 8/0284 |
| | | | | 429/481 |
| 2015/0064600 A1 | 3/2015 | Katsuno et al. | | |
| 2016/0149232 A1* | 5/2016 | Tanaka | ................ | H01M 8/0284 |
| | | | | 429/482 |

FOREIGN PATENT DOCUMENTS

| | | |
|---|---|---|
| JP | 2004-319461 A | 11/2004 |
| JP | 2009-252479 A | 10/2009 |
| JP | 2013-168353 A | 8/2013 |
| JP | 2017-212126 A | 11/2017 |
| KR | 10-0876262 B1 | 12/2008 |
| KR | 10-1473500 B1 | 12/2014 |
| KR | 10-1783060 B1 | 9/2017 |
| KR | 10-2018-0011716 A | 2/2018 |
| WO | 2011/083548 A1 | 7/2011 |

OTHER PUBLICATIONS

U.S. Office Action dated Jul. 21, 2021, issued in corresponding U.S. Appl. No. 16/676,335.
U.S. Office Action dated May 11, 2022, issued in corresponding U.S. Appl. No. 16/991,319.
U.S. Notice of Allowance dated Apr. 22, 2022, issued in corresponding U.S. Appl. No. 16/676,335.
Japanese Office Action dated Jul. 5, 2022, issued in corresponding Japanese Patent Application No. 2019-068666.
U.S. Office Action dated Sep. 23, 2022, issued in corresponding U.S. Appl. No. 16/991,319.

* cited by examiner

ELASTOMERIC CELL FRAME FOR FUEL CELL, MANUFACTURING METHOD OF THE SAME AND UNIT CELL USING THE SAME

CROSS-REFERENCE TO RELATED APPLICATION

This application claims priority to Korean Patent Application No. 10-2019-0094149, filed on Aug. 2, 2019 in the Korean Intellectual Property Office, the disclosure of which is incorporated herein by reference.

TECHNICAL FIELD

The present disclosure relates to an elastomeric cell frame for a fuel cell, a manufacturing method of the same and a unit cell using the same, and more particularly, to an elastomeric cell frame for a fuel cell assembled to a membrane electrode assembly and a gas diffusion layer using a sheet-shaped elastomeric frame, to be integrated with the membrane electrode assembly and the gas diffusion layer without using a separate bonding member, a manufacturing method of the same, and a unit cell using the same.

BACKGROUND

A fuel cell is a kind of electric generator to convert chemical energy of a fuel into electrical energy through an electrochemical reaction of the chemical energy in a stack. Such a fuel cell may be used not only for supply of driving power for industrial and domestic purposes and driving power of vehicles, but also for supply of electric power of miniature electronic products such as portable devices. Recently, the field of such fuel cell has been expanded in that the fuel cell is a highly efficient clean energy source.

In a unit cell of a general fuel cell, a membrane electrode assembly (MEA) is disposed at an innermost side of the unit cell. The MEA is constituted by a polymer electrolyte membrane to migrate protons, and catalyst layers coated on opposite surfaces of the polymer electrolyte membrane to react with hydrogen and oxygen, that is, a cathode and an anode, respectively.

In addition, a pair of separators is disposed at opposite surfaces of the MEA, that is, external portions of the MEA, at which the cathode and the anode are disposed, respectively, in order to supply reaction gas and to discharge water produced through reaction of the reaction gas. In this case, a gas diffusion layer (GDL) may be interposed between the MEA and each separator in order to diffuse or promote flow of the reaction gas and produced water.

In conventional cases, a membrane-electrode-gasket assembly (MEGA) having an integrated structure of a MEA and a gasket has often been used for sealing maintenance of a unit cell and convenience of a stacking process.

In addition, an integrated frame, wherein an insert comprising a MEA, and a GDL and a gasket are integrated with a MEA, has recently been proposed.

In the conventional integrated frame, however, the frame and the insert, which are made of plastic materials, are assembled using an adhesive. Furthermore, when a unit cell is manufactured using the conventional integrated frame, a separate bonding member and a sealing member are needed for bonding of a separator to the integrated frame. Such a process may cause an increase in material costs and manufacturing costs.

The above matters disclosed in this section are merely for enhancement of understanding of the general background of the disclosure and should not be taken as an acknowledgement or any form of suggestion that the matters form the related art already known to a person skilled in the art.

SUMMARY

The present disclosure has been made in view of the above problems, and it is an object of the present disclosure to provide an elastomeric cell frame for a fuel cell assembled to a membrane electrode assembly and a gas diffusion layer using a sheet-shaped elastomeric frame, to be integrated therewith without using a separate bonding member, a manufacturing method of the same, and a unit cell using the same.

In accordance with an aspect of the present disclosure, the above and other objects can be accomplished by the provision of an elastomeric cell frame for a fuel cell, the elastomeric cell frame composing a unit cell of the fuel cell and including an insert which includes: a membrane electrode assembly including a polymer electrolyte membrane and a pair of electrode layers respectively disposed on opposite surfaces of the polymer electrolyte membrane; and a pair of gas diffusion layers respectively disposed on opposite surfaces of the membrane electrode assembly and being bonded to the membrane electrode assembly. The insert further includes an elastomeric frame surrounding one of opposite edge surfaces of the insert and a side surface of the insert in an external region of the insert. The elastomeric frame is interface-bonded, through thermal bonding, to portions of the polymer electrolyte membrane and the electrode layers exposed at the one of opposite edge surfaces of the insert and the side surface of the insert.

The elastomeric frame may include an insert receiving hole in which the insert is disposed, and the insert receiving hole may be formed, on an internal peripheral surface thereof, with a step surrounding one of opposite surfaces of the insert and the side surface of the insert. The membrane electrode assembly may include the polymer electrolyte membrane, a first electrode layer formed on one of the opposite surfaces of the polymer electrolyte membrane, the surface of the polymer electrolyte membrane being seated on the step, and a second electrode layer formed on the other surface of the polymer electrolyte membrane. The pair of gas diffusion layers may include a first gas diffusion layer bonded to the first electrode layer, and a second gas diffusion layer bonded to the second electrode layer.

In the insert, at least, one edge surface of the polymer electrolyte membrane and one edge surface of the first electrode layer and a side surface of the first electrode layer may be formed to contact the elastomeric frame. A first thermal-bonded portion may be formed between the insert and the elastomeric frame. The step of the elastomeric frame and the edge surface of the first electrode layer may contact each other and may be thermally bonded to each other at the first thermal-bonded portion. A second thermal-bonded portion may be formed between the insert and the elastomeric frame. The step of the elastomeric frame and the side surface of the first electrode layer may contact each other and may be thermally bonded to each other at the second thermal-bonded portion. A third thermal-bonded portion may be formed between the insert and the elastomeric frame. The step of the elastomeric frame and the edge surface of the polymer electrolyte membrane may contact each other and may be thermally bonded to each other at the third thermal-bonded portion.

A side surface of the polymer electrolyte membrane in the insert may be formed to contact the elastomeric frame. A fourth thermal-bonded portion may be formed between the insert and the elastomeric frame. The internal peripheral surface of the insert receiving hole formed on the elastomeric frame and the side surface of the polymer electrolyte membrane may contact each other and may be thermally bonded to each other at the fourth thermal-bonded portion.

A side surface of the second electrode layer in the insert may be formed to contact the elastomeric frame. A fifth thermal-bonded portion may be formed between the insert and the elastomeric frame. The internal peripheral surface of the insert receiving hole formed on the elastomeric frame and the side surface of the second electrode layer may contact each other and may be thermally bonded to each other at the fifth thermal-bonded portion.

In the insert, the other edge surface of the polymer electrolyte membrane, the other edge surface of the second electrode layer, and the side surface of the second electrode layer may be formed to be exposed. The elastomeric cell frame may further include an elastomeric cover disposed between the elastomeric frame and the insert. The elastomeric cover may be thermally bonded to the exposed other edge surface of the polymer electrolyte membrane, the exposed other edge surface of the second electrode layer and the exposed side surface of the second electrode layer while covering the exposed surfaces.

A sixth thermal-bonded portion may be formed between the elastomeric frame and the elastomeric cover. The internal peripheral surface of the insert receiving hole formed on the elastomeric frame and a side surface of the elastomeric cover may contact each other and may be thermally bonded to each other at the sixth thermal-bonded portion.

A seventh thermal-bonded portion may be formed between the insert and the elastomeric cover. The elastomeric cover and the other edge surface of the polymer electrolyte membrane may contact each other and may be thermally bonded to each other at the seventh thermal-bonded portion. An eighth thermal-bonded portion may be formed between the insert and the elastomeric cover. The elastomeric cover and the side surface of the second electrode layer may contact each other and may be thermally bonded to each other at the eighth thermal-bonded portion. A ninth thermal-bonded portion may be formed between the insert and the elastomeric cover. The elastomeric cover and the other edge of the second electrode layer may contact each other and may be thermally bonded to each other at the ninth thermal-bonded portion.

The elastomeric cover may be formed with a cover extension to cover the other surface of the second gas diffusion layer.

The elastomeric frame may be formed, at one side thereof, with a plurality of manifold inlet through holes, through which reaction gas and coolant are introduced, and may be formed, at the other side thereof, with a plurality of manifold outlet through holes, through which reaction gas and coolant are discharged.

At least one protrusion seal may be formed at at least one of the upper and lower surfaces of the elastomeric frame, to surround the insert along the external region of the insert.

The elastomeric frame is composed of thermoplastic elastomer (TPE).

The thermoplastic elastomer (TPE) may include a resin-based hard segment and a rubber-based soft segment.

The elastomeric cover may be composed of a thermoplastic elastomer (TPE), similarly to the elastomeric frame.

In this case, the thermoplastic elastomer (TPE) may include a resin-based hard segment and a rubber-based soft segment.

In accordance with another aspect of the present disclosure, there is provided a method for manufacturing a cell frame composing a unit cell of a fuel cell stack, including: an insert preparation step of preparing a membrane electrode assembly by forming a pair of electrode layers on opposite surfaces of a polymer electrolyte membrane, and preparing an insert by bonding gas diffusion layers on opposite surfaces of the prepared membrane electrode assembly, respectively; an elastomeric frame preparation step of preparing an elastomeric frame having a sheet form; a disposition step of disposing the insert and the elastomeric frame such that an edge of the insert overlaps with the elastomeric frame; and an assembly step of integrating the insert and the elastomeric frame with each other by pressing the insert against the elastomeric frame at overlapping portions thereof while applying heat to the overlapping portions, thereby thermally bonding the overlapping portions.

In the elastomeric frame preparation step, the elastomeric frame may be prepared by molding a thermoplastic elastomer (TPE) into a sheet form.

In the elastomeric frame preparation step, the thermoplastic elastomer (TPE) may be formed using a resin-based hard segment and a rubber-based soft segment. In the assembly step, heat applied to the elastomeric frame may be higher than a melting temperature of the resin-based hard segment used to form the elastomeric frame, but lower than a combustion temperature of the rubber-based soft segment used to form the elastomeric frame.

In the assembly step, the elastomeric frame may be thermally bonded, thereby being assembled to the insert without using a separate bonding member.

In the assembly step, thermal bonding of the overlapping portions of the elastomeric frame and the insert may be carried out through at least one of hot-press bonding, ultrasonic bonding, high-frequency bonding, vibration bonding, infrared bonding, radiant-heat bonding, calender bonding, or laser bonding.

The manufacturing method may further include an elastomeric cover preparation step of preparing an elastomeric cover having a sheet form. In the disposition step, the insert, the elastomeric frame and the elastomeric cover may be disposed such that the edge of the insert overlaps with the elastomeric frame and the elastomeric cover. In the assembly step, the insert, the elastomeric frame and the elastomeric cover may be pressed at overlapping portions thereof in a state in which heat is applied to the overlap portions, thereby thermally bonding the overlapping portions such that the insert, the elastomeric frame and the elastomeric cover are integrated.

In accordance with another aspect of the present disclosure, there is provided a unit cell for a fuel cell including an insert which comprises: a membrane electrode assembly including a polymer electrolyte membrane and a pair of electrode layers respectively disposed on opposite surfaces of the polymer electrolyte membrane; and a pair of gas diffusion layers respectively disposed on opposite surfaces of the membrane electrode assembly while being bonded to the membrane electrode assembly; a sheet-shaped elastomeric frame disposed to surround one of opposite edge surfaces of the insert and a side surface of the insert in an external region of the insert, the elastomeric frame being interface-bonded, through thermal bonding, to portions of the polymer electrolyte membrane and the electrode layers exposed at the edge surface of the insert and the side surface of the insert, and a pair of separators respectively disposed on opposite surfaces of the elastomeric cell frame, to guide flow of reaction gas and coolant.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Reference will now be made in detail to embodiments, examples of which are illustrated in the accompanying drawings. However, the present disclosure may be embodied in many different forms and should not be construed as limited to the exemplary embodiments set forth herein. Rather, these exemplary embodiments are provided so that this disclosure will be thorough and complete, and will fully convey the scope of the disclosure to those skilled in the art. The present disclosure is defined only by the categories of the claims. Wherever possible, the same reference numbers will be used throughout the drawings to refer to the same or like parts.

Figure 1:
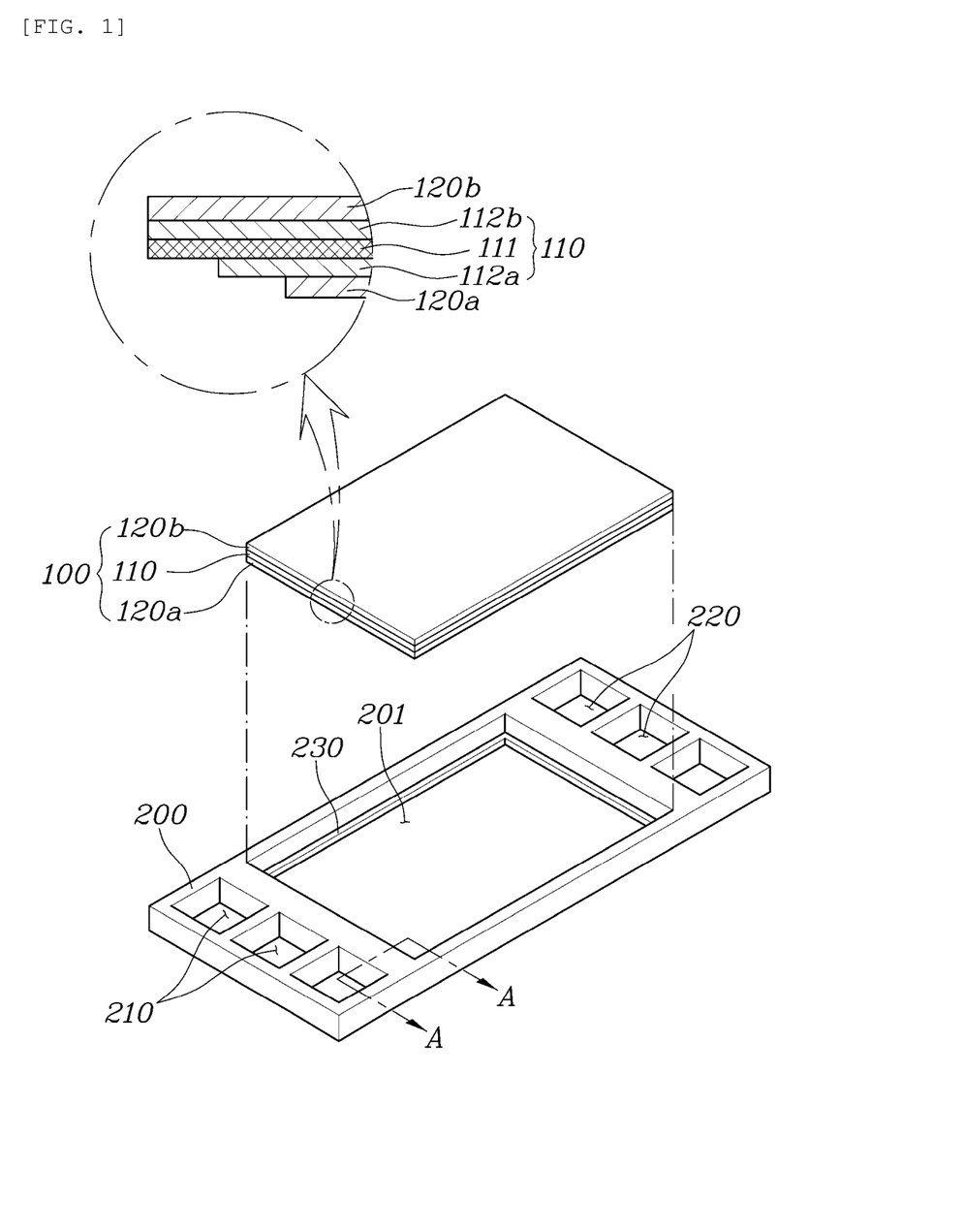
FIG. 1 is an exploded perspective view illustrating an elastomeric cell frame for a fuel cell according to an exemplary embodiment of the present disclosure.
Figure 2:
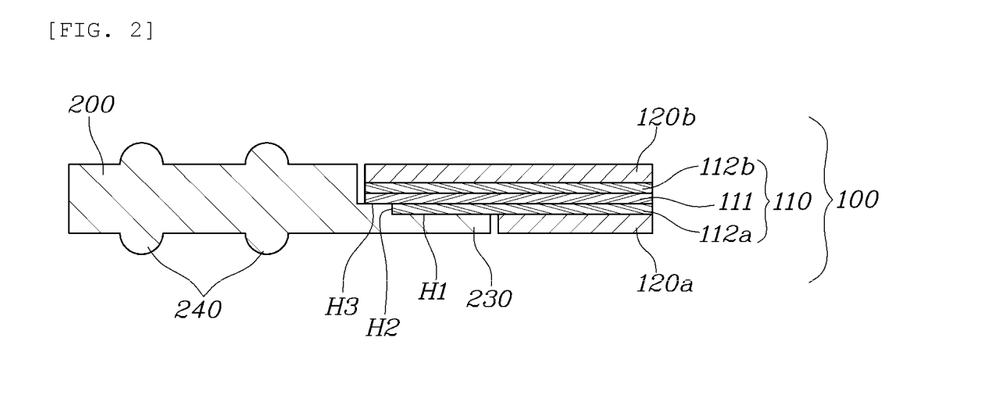
FIG. 2 is a cross-sectional view illustrating a portion of the elastomeric cell frame for the fuel cell according to an exemplary embodiment of the present disclosure.

FIG. 1 is an exploded perspective view illustrating an elastomeric cell frame for a fuel cell according to an exemplary embodiment of the present disclosure. FIG. 2 is a cross-sectional view illustrating a portion of the elastomeric cell frame for the fuel cell according to an exemplary embodiment of the present disclosure. FIGS. 3 to 9 are cross-sectional views illustrating portions of elastomeric cell frames for fuel cells according to other exemplary embodiments of the present disclosure, respectively. FIGS. 2 to 9 are cross-sectional views taken along line A-A in FIG. 1.

As illustrated in FIG. 1, an elastomeric cell frame for a fuel cell according to an exemplary embodiment of the present disclosure includes, as elements forming a unit cell of the fuel cell together with a pair of separators (not shown), an insert 100 including a membrane electrode assembly 110 and a pair of gas diffusion layers 120a and 120b disposed at opposite surfaces of the membrane electrode assembly 110 while being bonded to the membrane electrode assembly 110, and an elastomeric frame 200 formed at an external region of the insert 100, to be integrated with the insert 100 through thermal bonding.

The insert 100 is an assembly in which the membrane electrode assembly 110 and the pair of gas diffusion layers 120a and 120b are laminated. The gas diffusion layers 120a and 120b may be disposed and laminated on a first surface and the other surface of the membrane electrode assembly 110, respectively.

In the following description, for convenience of description, a lower direction in the drawings is defined as one direction, and an upper direction in the drawings is defined as the other direction. As such, a lower surface of the membrane electrode assembly 110 in the drawings is referred to as "first surface", and an upper surface of the membrane electrode assembly 110 in the drawings is referred to as "second surface".

The membrane electrode assembly 110 is embodied as a general membrane electrode assembly constituted by a polymer electrolyte membrane capable of migrating protons, and electrode layers disposed at opposite surfaces of the polymer electrolyte membrane while being coated with catalysts to react with hydrogen and oxygen, that is, a cathode and an anode. Accordingly, the membrane electrode assembly 110 according to an exemplary embodiment includes a polymer electrolyte membrane 111, and a pair of electrode layers 112a and 112b formed at opposite surfaces of the polymer electrolyte membrane 111, that is, a first electrode layer 112a formed at one surface of the polymer electrolyte membrane 111 and a second electrode layer 112b formed at the other surface of the polymer electrolyte membrane 111.

The gas diffusion layers 120a and 120b are means for allowing reaction gas flowing through the separators (not shown) to pass through the membrane electrode assembly 110 while diffusing the reaction gas. Each of the gas diffusion layers 120a and 120b may be constituted by a substrate alone, or may be constituted by a substrate and a microporous layer (MPL) formed at one surface of the substrate. In this case, materials of the substrate and the microporous layer are embodied as materials applied to a general gas diffusion layer. Accordingly, the pair of gas diffusion layers according to an exemplary embodiment is constituted by a first gas diffusion layer 120a bonded to the first electrode layer 112a in one direction of the first electrode layer 112a, and a second gas diffusion layer 120b bonded to the second electrode layer 112b in the other direction of the second electrode layer 112b.

In order to easily assemble the insert 100 to the elastomeric frame 200 through thermal bonding, the polymer electrolyte membrane 111 and the electrode layers 112a and 112b, which may be relatively easily thermally bonded to the elastomeric frame 200, as compared to the gas diffusion layers 120a and 120b, contact the elastomeric frame 200 directly. To this end, in the insert 100, one edge surface of the polymer electrolyte membrane 111 and one edge surface of the first electrode layer 112a and a side surface of the first electrode layer 112a may be exposed.

As illustrated in FIG. 2, one-side lateral ends of the second electrode layer 112b and the second gas diffusion layer 120b, which are formed in the other direction of the polymer electrolyte membrane 111, are formed to be vertically aligned with a corresponding lateral end of the polymer electrolyte membrane 111, and one-side lateral ends of the first electrode layer 112a and the first gas diffusion layer 120a, which are formed in one direction of the polymer electrolyte membrane 111, are formed to be shorter than the corresponding lateral end of the polymer electrolyte membrane 111. In addition, the lateral end of the first gas diffusion layer 120a is formed to be shorter than the lateral end of the first electrode layer 112a. Accordingly, a side surface of the polymer electrolyte membrane 111 and an edge of one surface of the polymer electrolyte membrane 111, that is, one edge surface, are exposed. In addition, the side surface of the first electrode layer 112a and an edge of one surface of the first electrode layer 112a, that is, one edge surface, are exposed. Similarly to the side surface of the polymer electrolyte membrane 111, a side surface of the second electrode layer 112b is also exposed.

For maintenance of sealing of the insert 100 and convenience of a stacking process, the elastomeric frame 200 includes a means for forming the elastomeric frame 200 to be integrated with the external region of the insert 100. As this means, the elastomeric frame 200 is composed of a thermoplastic elastomer (TPE), and as such, may be assembled to the insert 100 through thermal bonding without using a separate bonding member while maintaining a predetermined shape.

In this case, the thermoplastic elastomer (TPE) may include a resin-based hard segment and a rubber-based soft segment. Accordingly, the resin-based hard segment contributes to thermal bonding of the elastomeric frame 200, and the soft segment contributes to elasticity and shape maintenance of the elastomeric frame 200.

As the thermoplastic elastomer (TPE), styrene, olefin, urethane, amide, polyester-based thermoplastic elastomers, etc. may be applied. Alternatively, a polyolefin-based thermoplastic elastomer may be applied. In this case, the resin-based hard segment is composed of polyolefin resin such as polyethylene (PE) or polypropylene (PP), and the rubber-based soft segment may be composed of olefin-based rubber such as ethylene propylene diene monomer (EPDM) rubber.

The elastomeric frame 200 is disposed to surround one of opposite edge surfaces of the insert 100 and a side surface of the insert 100 in the external region of the insert 100. The elastomeric frame 200 is thermally bonded to the polymer electrolyte membrane 111 and the electrode layers 112a and 112b exposed at the edge surface of the insert 100 and the side surface of the insert 100 at interfaces therebetween, to be integrated therewith. Here, the "external region" of the insert 100 means an area including a peripheral area of the insert 100 and a space therearound, and the "edge" of the insert 100 means the peripheral area of the insert 100. In addition, the elastomeric frame 200 is disposed to surround one of opposite edge surfaces of the insert 100 and the side surface of the insert 100 in the peripheral area of the insert 100. Accordingly, in the following description, for convenience of description, one of opposite edge surfaces of the insert 100 will be referred to as "one surface" which is a lower surface when viewed in the drawings. One of opposite edge surfaces of the insert 100 may be the edge surface of the insert 100 opposite to one edge surface without being limited to "one surface".

For example, as illustrated in FIGS. 1 and 2, the elastomeric frame 200 surrounds the external region of the insert 100 while contacting one edge surface of the insert 100 and the side surface of the insert 100.

In particular, the elastomeric frame 200 may have an extended interface with the insert 100, for tight bonding thereof to the insert 100.

For example, the elastomeric frame 200 is formed with an insert receiving hole 201 in which the insert 100 is disposed. A step 230 is formed at an internal peripheral surface of the insert receiving hole 201 to surround one surface of the insert 100 and the side surface of the insert 100.

Accordingly, thermal-bonded portions are formed at interfaces between the insert 100 and the elastomeric frame 200 in accordance with thermal bonding, and as such, firm assembly and integration are achieved between the insert 100 and the elastomeric frame 200.

In more detail, as illustrated in FIG. 2, the insert 100 is formed such that one edge surface of the polymer electrolyte membrane 111, one edge surface of the first electrode layer 112a, and the side surface of the first electrode layer 112a contact the elastomeric frame 200. That is, a first thermal-bonded portion H1, a second thermal-bonded portion H2, and a third thermal-bonded portion H3 are formed between the insert 100 and the elastomeric frame 200. At the first thermal-bonded portion H1, the step 230 of the elastomeric frame 200 contacts the one edge surface of the first electrode layer 112a, to be thermally bonded thereto. At the second thermal-bonded portion H2, the step 230 of the elastomeric frame 200 contacts the side surface of the first electrode layer 112a, to be thermally bonded thereto. At the third thermal-bonded portion H3, the step 230 of the elastomeric frame 200 contacts the one edge surface of the polymer electrolyte membrane 111, to be thermally bonded thereto.

In this case, as illustrated in FIG. 2, side surfaces of the first gas diffusion layer 120a, the polymer electrolyte membrane 111, the second electrode layer 112b and the second gas diffusion layer 120b, which are included in the side surface of the insert 100, may be disposed to be spaced apart from the elastomeric frame 200.

Figure 3:
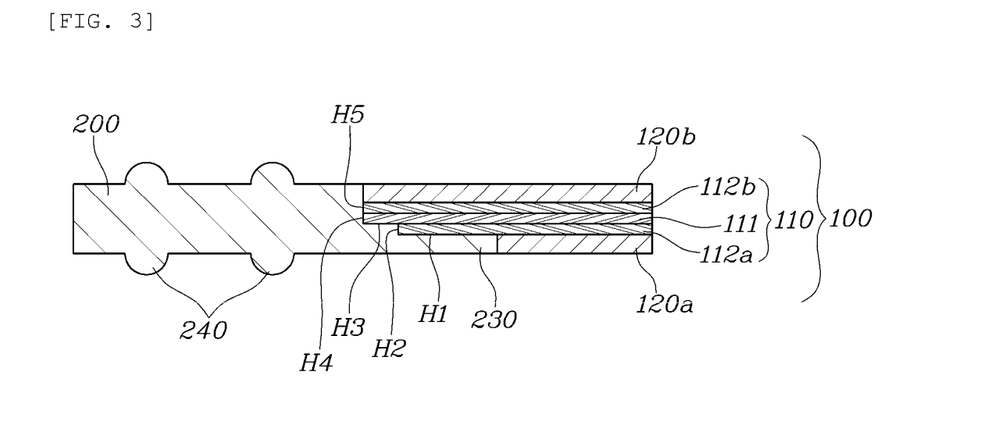
FIGS. 3 to 9 are cross-sectional views illustrating portions of elastomeric cell frames for fuel cells according to other exemplary embodiments of the present disclosure, respectively.

As illustrated in FIG. 3, all of the side surfaces of the first gas diffusion layer 120a, the polymer electrolyte membrane 111, the second electrode layer 112b and the second gas diffusion layer 120b, which are included in the side surface of the insert 100, may be disposed to contact the elastomeric frame 200 directly.

In this case, a fourth thermal-bonded portion H4 and a fifth thermal-bonded portion H5 are formed. At the fourth thermal-bonded portion H4, the side surface of the polymer electrolyte membrane 111 contacts the internal peripheral surface of the insert receiving hole 201 formed at the elastomeric frame 200, to be thermally bonded thereto. At the fifth thermal-bonded portion H5, the side surface of the second electrode layer 112b contacts the internal peripheral surface of the insert receiving hole 201 formed at the elastomeric frame 200, to be thermally bonded thereto.

In this case, the side surfaces of the first and second gas diffusion layers 120a and 120b may be thermally bonded to the elastomeric frame 200 at interfaces therebetween, and as such, may be bonded to the elastomeric frame 200. In this case, the coupling force of the first and second gas diffusion layers 120a and 120b at the interfaces thereof may be smaller than those of the first thermal-bonded portion H1 and the fifth thermal-bonded portion H5 because the first and second gas diffusion layers 120a and 120b exhibit low bonding performance to the elastomeric frame 200 due to the characteristics of materials thereof.

Figure 4:
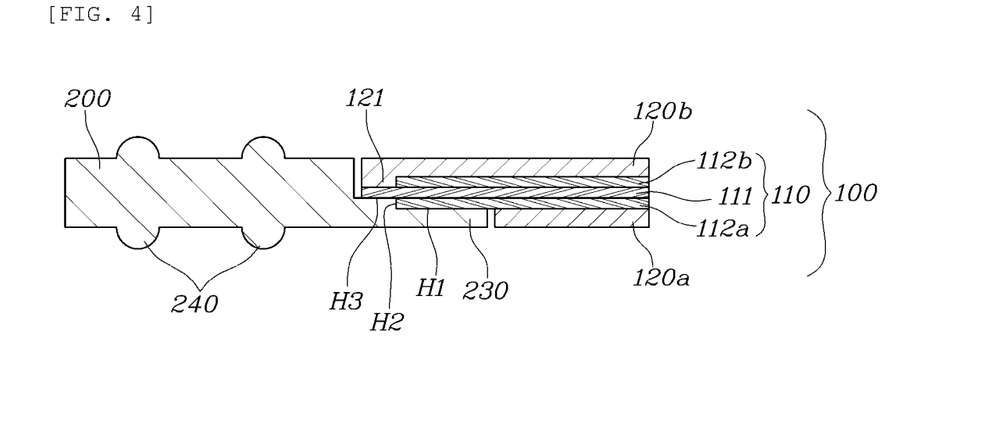

When both lateral ends of the first and second electrode layers 112a and 112b are formed to be shorter than the lateral end of the polymer electrolyte membrane 111 while being disposed to be spaced apart from the elastomeric frame 200, as illustrated in FIG. 4, the lateral end of the second gas diffusion layer 120b is further extended to be vertically aligned with the lateral end of the second gas diffusion layer 120b while forming a gas diffusion layer extension 121 covering the second electrode layer 112b, in order to protect the side surface of the second electrode layer 112b. In this case, the side surfaces of the first gas diffusion layer 120a, the polymer electrolyte membrane 111 and the second gas diffusion layer 120b, which are included in the side surface of the insert 100, may be disposed to be spaced apart from the elastomeric frame 200.

Figure 5:
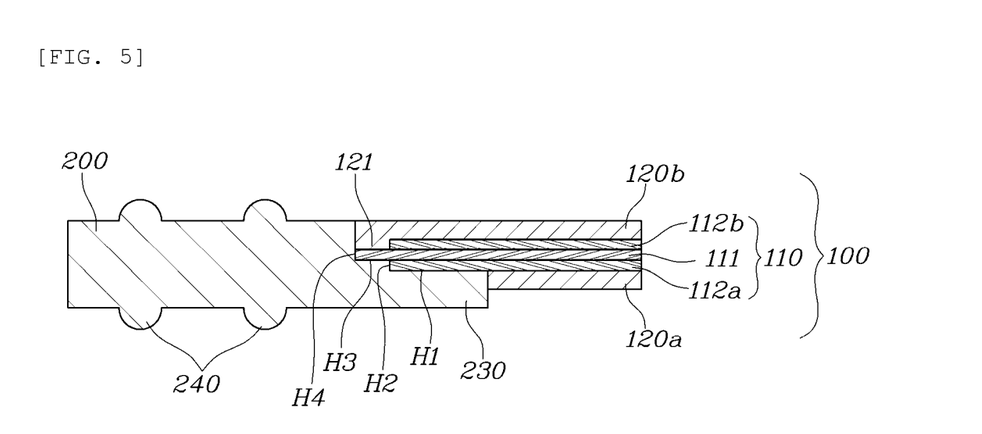

In addition, even when the lateral end of the second gas diffusion layer 120b is further extended to be vertically aligned with the lateral end of the second gas diffusion layer 120b while forming the gas diffusion layer extension 121 covering the second electrode layer 112b, as illustrated in FIG. 5, all of the side surfaces of the first gas diffusion layer 120a, the polymer electrolyte membrane 111 and the second gas diffusion layer 120b, which are included in the side surface of the insert 100, may be disposed to contact the elastomeric frame 200 directly.

In this case, the fourth thermal-bonded portion H4, at which the side surface of the polymer electrolyte membrane 111 contacts the internal peripheral surface of the insert receiving hole 201 formed at the elastomeric frame 200, to be thermally bonded thereto, is formed.

Figure 6:
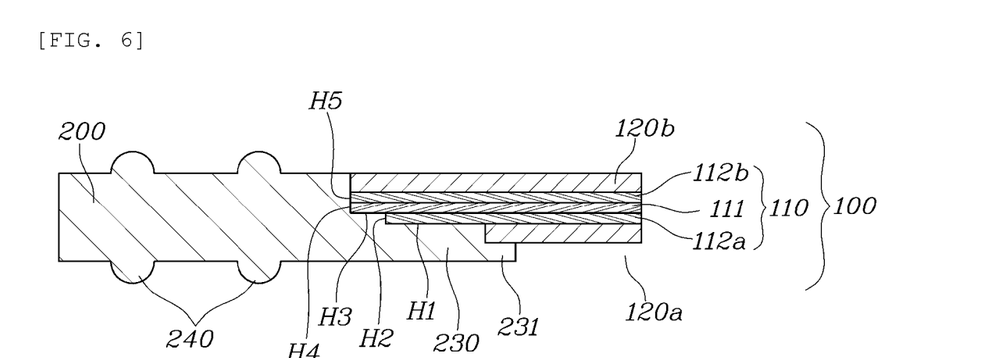

As illustrated in FIG. 6, a step extension 231 may be formed at the step 230 of the elastomeric frame 200 such that the step extension 231 extends to surround one edge surface of the first gas diffusion layer 120a, in order to enable the insert 100 to be more stably disposed. In addition, as the step extension 231 is formed, the electrode layer 112a may be prevented from being exposed.

Figure 7:
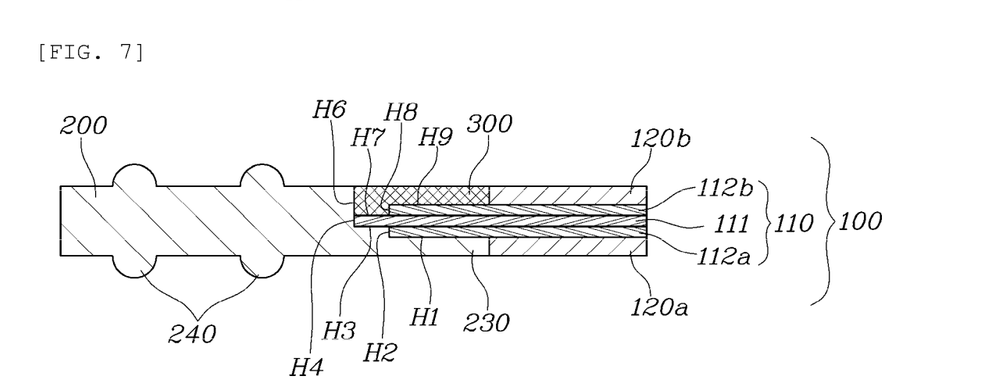

In addition, as illustrated in FIG. 7, the elastomeric cell frame may further include an elastomeric cover 300 for assisting the elastomeric frame 200, for easier disposition and thermal bonding upon bonding of the elastomeric frame 200 and the insert 100.

As illustrated in FIG. 7, in the insert 100, the lateral ends of the second electrode layer 112b and the second gas diffusion layer 120b may be formed to be shorter than the lateral end of the polymer electrolyte membrane 111 in order to expose the other edge surface of the polymer electrolyte membrane 111, the other edge surface of the second electrode layer 112b and the side surface of the second electrode layer 112b. In addition, the lateral end of the second gas diffusion layer 120b may be formed to be shorter than the lateral end of the second electrode layer 112b. As such, the other edge surface of the polymer electrolyte membrane 111, the side surface of the second electrode layer 112b and the other edge surface of the second electrode layer 112b are exposed.

Then, the elastomeric cover 300 is provided between the elastomeric frame 200 and the insert 100 in order to cover the exposed other edge surface of the polymer electrolyte membrane 111, the exposed side surface of the second electrode layer 112b and the exposed other edge surface of the second electrode layer 112b. Accordingly, a thermal-bonded portion is formed at an interface between the elastomeric cover 200 and each of the elastomeric frame 200 and the insert 100 in accordance with thermal bonding and, as such, firm bonding and integration between the elastomeric cover 200 and each of the elastomeric frame 200 and the insert 100 may be achieved.

In more detail, as illustrated in FIG. 7, a sixth thermal-bonded portion H6 is formed. At the sixth thermal-bonded portion H6, the side surface of the elastomeric cover 300 contacts the internal peripheral surface of the insert receiving hole 201 formed at the elastomeric frame 200, to be thermally bonded thereto.

In addition, a seventh thermal-bonded portion H7, an eighth thermal-bonded portion H8 and a ninth thermal-bonded portion H9 are formed. At the seventh thermal-bonded portion H7, the elastomeric cover 300 contacts the other edge surface of the polymer electrolyte membrane 111, to be thermally bonded thereto. At the eighth thermal-bonded portion H8, the elastomeric cover 300 contacts the side surface of the second electrode layer 112b, to be thermally bonded thereto. At the ninth thermal-bonded portion H9, the elastomeric cover 300 contacts the other edge surface of the second electrode layer 112b, to be thermally bonded thereto.

Figure 8:
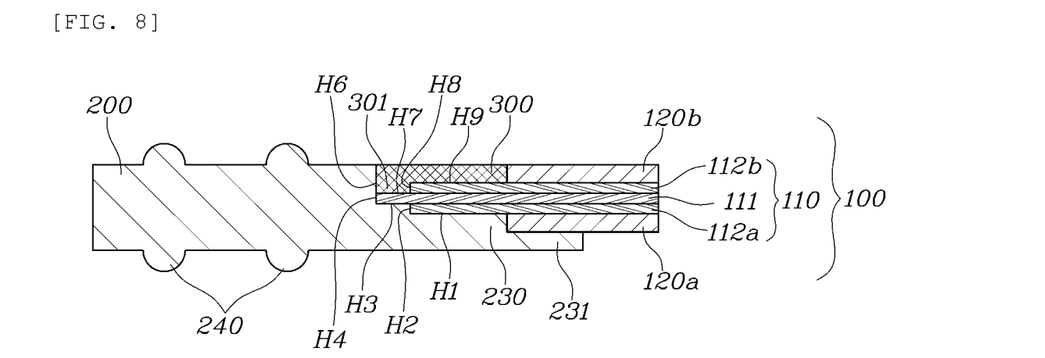

Even when the elastomeric cover 300 is provided, the step extension 231 may be formed at the step 230 of the elastomeric frame 200 such that the step extension 231 extends to surround one edge surface of the first gas diffusion layer 120a, as illustrated in FIG. 8, in order to enable the insert 100 to be more stably disposed.

Figure 9:
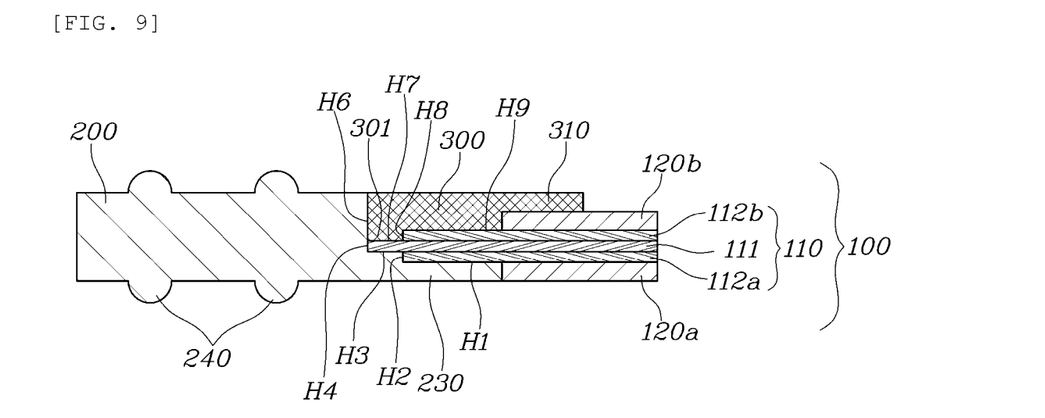

In addition, as illustrated in FIG. 9, a cover extension 310 may be formed at the elastomeric cover 300 such that the cover extension 310 covers the other surface of the second gas diffusion layer 120b, in order to enable the insert 100 to be more stably disposed.

Similar to the elastomeric frame 200, the elastomeric cover 300 is composed of a thermoplastic elastomer (TPE), to be assembled to the insert 100 through thermal bonding without using a separate bonding member while maintaining a predetermined shape. In this case, the thermoplastic elastomer (TPE) forming the elastomeric cover 300 may include a resin-based hard segment and a rubber-based soft segment, similarly to the TPE applied to the elastomeric frame 200.

The elastomeric frame 200 is formed with a manifold inlet through hole and a manifold outlet through hole, for formation of a manifold to introduce reaction gas and coolant to a reaction surface formed by the insert 100 and to discharge the introduced reaction gas and coolant from the reaction surface.

For example, a plurality of manifold inlet through holes 210 is formed at one side of the elastomeric frame 200, for introduction of reaction gas and coolant, and a plurality of manifold outlet through holes 220 is formed at the other side of the elastomeric frame 200, for discharge of reaction gas and coolant.

A means for sealing the elastomeric frame 200 from the separators may be formed at the elastomeric frame 200.

For example, at least one protrusion seal 240 may be formed at each of upper and lower surfaces of the elastomeric frame 200 such that the protrusion seal 240 surrounds the insert 100 along the external region of the insert 100.

Hereinafter, a method for manufacturing the elastomeric cell frame for fuel cells configured as described above will be described.

In accordance with another exemplary embodiment of the present disclosure, an elastomeric cell frame manufacturing method includes: an insert preparation step of preparing the membrane electrode assembly 110 by forming a pair of electrode layers 112a and 112b at opposite surfaces of the polymer electrolyte membrane 111, and preparing the insert 100 by bonding the gas diffusion layers 120a and 120b at opposite surfaces of the prepared membrane electrode assembly 110, respectively; an elastomeric frame preparation step of preparing the elastomeric frame 200, which has a sheet form; a disposition step of disposing the insert 100 and the elastomeric frame 200 such that the edge of the insert 100 overlaps with the elastomeric frame 200; and an assembly step of integrating the insert 100 and the elastomeric frame 200 with each other by pressing the insert 100 against the elastomeric frame 200 at overlapping portions thereof while applying heat to the overlapping portions, thereby thermally bonding the overlapping portions.

The insert preparation step is the step of preparing the insert 100 by bonding the first and second gas diffusion layers 120a and 120b to the membrane electrode assembly 110.

In this case, as the membrane electrode assembly 110, a general membrane electrode assembly, which includes the polymer electrolyte membrane 111, and the first and second electrode layers 112a and 112b respectively formed at opposite surfaces of the polymer electrolyte membrane 111, is prepared. In the insert 100, the polymer electrolyte membrane 111 and the electrode layers 112a and 112b, which exhibit relatively easy thermal bonding to the elastomeric frame 200, as compared to the gas diffusion layers 120a and 120b, contact the elastomeric frame 200 directly in order to achieve easy bonding of the insert 100 to the elastomeric frame 200 through thermal bonding. As in the above-described exemplary embodiments, the polymer electrolyte membrane 111, the first electrode layer 112a and the second electrode layer 112b may be prepared while having various lateral end lengths.

In addition, as each of the first and second gas diffusion layers 120a and 120b, a general gas diffusion layer, which is constituted by a substrate alone, or is constituted by a substrate and a microporous layer (MPL) formed at one surface of the substrate, is prepared. In this case, as in the above-described exemplary embodiments, the first and second gas diffusion layers 120a and 120b may be prepared while having various lateral end lengths.

In addition, the insert 100 is prepared by laminating the first and second gas diffusion layers 120a and 120b over opposite surfaces of the membrane electrode assembly 110, respectively.

The elastomeric frame preparation step is the step of preparing the elastomeric frame 200, which has a sheet form, and is disposed to surround the external region of the insert 100.

The elastomeric frame 200 is prepared by molding a thermoplastic elastomer (TPE) into a sheet form. In this case, the thermoplastic elastomer (TPE) is constituted by a resin-based hard segment and a rubber-based soft segment. For example, the resin-based hard segment is composed of polyolefin resin such as polyethylene (PE) or polypropylene (PP), and the rubber-based soft segment may be composed of olefin-based rubber such as ethylene propylene diene monomer (EPDM) rubber.

The prepared thermoplastic elastomer is molded into a sheet form through an injection molding and, as such, the elastomeric frame 200 is prepared.

During molding of the elastomeric frame 200, the insert receiving hole 201, in which the insert 100 will be disposed, the plural manifold inlet through holes 210, through which reaction gas and coolant will be introduced, the plural manifold outlet through holes 220, through which reaction gas and coolant will be discharged, and the step 230, which surrounds the lower surface of the insert 100 and the side surface of the insert 100 are formed. In addition, at least one protrusion seal 240 for sealing of the insert 100 from the separators is formed.

In the disposition step, the insert 100 is disposed such that the edge of the insert 100 overlaps with the elastomeric frame 200. The lower edge surface of the insert 100 may be seated on the step 230 of the elastomeric frame 200, and the side surface of the insert 100 may contact the internal peripheral surface of the insert receiving hole 201 in the elastomeric frame 200.

The assembly step is the step of bonding the elastomeric frame 200 and the insert 100 to each other through thermal bonding of the elastomeric frame 200.

As the method of thermally bonding the elastomeric frame 200 and the insert 100 at overlapping portions thereof in the assembly step, various methods capable of simultaneously providing heat and pressure may be applied. For example, the thermal bonding method may be implemented through at least one of hot-press bonding, ultrasonic bonding, high-frequency bonding, vibration bonding, infrared bonding, radiant-heat bonding, calender bonding, or laser bonding. The overlapping portions of the elastomeric frame and the insert may be thermally bonded through hot-press bonding, which may easily provide heat and pressure.

In this case, the elastomeric frame 200 and the insert 100 are seated in a hot-press mold.

Subsequently, the hot-press mold is operated to press a portion or overall portion of an area corresponding to the external region of the insert 100 while applying heat thereto.

As a result, a predetermined portion of the elastomeric frame 200 is melted, and is then bonded to the insert 100. Thus, the elastomeric frame 100 is thermally bonded at an interface between the elastomeric frame 200 and the insert 100, and as such, the elastomeric frame 200 and the insert 100 are bonded to each other without using a separate bonding member.

Heat applied to the elastomeric frame 200 may be higher than the melting temperature of the elastomeric frame 200 in order to achieve firm assembly of the elastomeric frame 200 and the insert 100. In particular, when the thermoplastic elastomer (TPE) applied to the elastomeric frame is constituted by a resin-based hard segment and a rubber-based soft segment, heat applied to the elastomeric frame 200 may be higher than a melting temperature of the resin-based hard segment, but lower than a combustion temperature of the rubber-based soft segment. If heat applied to the elastomeric frame 200 is lower than the melting temperature of the resin-based hard segment, the elastomeric frame 200 may not be melted and, as such, no thermal bonding may be achieved. If heat applied to the elastomeric frame 200 is higher than the combustion temperature of the rubber-based soft segment, there may be a problem in that the rubber-based soft segment may be combusted.

When the elastomeric cover 300 is further provided, the elastomeric cell frame manufacturing method further includes an elastomeric cover preparation step of preparing the elastomeric cover 300, which has a sheet form.

In this case, in the disposition step, the insert 100 and the elastomeric frame 200 are disposed such that the edge of the insert 100 overlaps with the elastomeric frame 200 and the elastomeric cover 300. In the assembly step, the insert 100, the elastomeric frame 200 and the elastomeric cover 300 are pressed at overlapping portions thereof in a state in which heat is applied to the overlap portions, thereby thermally bonding the overlapping portions. Accordingly, the insert 100, the elastomeric frame 200 and the elastomeric cover 300 are integrated.

The elastomeric cell frame for fuel cells configured as described above constitutes a unit cell for a fuel cell, together with separators.

In more detail, the unit cell includes the insert 100, which includes: the membrane electrode assembly 110 including the polymer electrolyte membrane 111 and the pair of electrode layers 112a and 112b formed at opposite surfaces of the polymer electrolyte membrane 111, and the pair of gas diffusion layers 120a and 120b respectively disposed at opposite surfaces of the membrane electrode assembly 110 while being bonded to the membrane electrode assembly 110; the elastomeric cell frame including the sheet-shaped elastomeric frame 200 disposed to surround the lower edge surface of the insert 100 and the side surface of the insert 100 in the external region of the insert 100 while being bonded to the lower edge surface of the insert 100 and the side surface of the insert 100 through thermal bonding, to be integrated therewith; and a pair of separators (not shown) respectively disposed at opposite surfaces of the elastomeric cell frame, to guide flow of reaction gas and coolant. In addition, the unit cell may further include a metallic porous body (not shown) interposed between each of the gas diffusion layers 120a and 120b and a corresponding one of the separators, to achieve easier diffusion of reaction gas.

As apparent from the above description, in accordance with the exemplary embodiments of the present disclosure, there are the following effects.

First, it may be unnecessary to provide a separate bonding member for interface bonding of the elastomeric cell frame to the separator or the insert. Accordingly, material costs may be reduced, and an adhesive coating process may be eliminated, and as such, manufacturing costs may be reduced.

Second, it may be possible to secure sealing of a reaction area without using a separate sealing member. Since a sealing member is unnecessary, material costs may be reduced, and a sealing member molding process may be eliminated, and as such, manufacturing costs may be reduced.

Third, it may be possible to basically prevent moisture produced in the reaction area from being diffused to the outside of the cell through the electrolyte membrane. Accordingly, electrical short circuit between cells may be prevented. In addition, it may be possible to prevent a fuel cell stack from being corroded due to leaked moisture.

Fourth, it is unnecessary to use the electrolyte membrane in areas other than the reaction area, and as such, it may be possible to reduce costs in terms of manufacturing costs.

Fifth, there is an advantage of a reduction in cell pitch, as compared to conventional plastic frames. In addition, stack miniaturization may be achieved through a reduction in volume.

Sixth, an effect of weight reduction may be expected, as compared to conventional cases in which a bonding member and a sealing member are used in a plastic frame.

Seventh, production line simplification and stack productivity (cell stacking) enhancement may be achieved in accordance with a reduced integration process associated with stacking of fuel cells.

Eighth, constituent elements of the unit cell are integrated through thermal bonding after being seated in a mold and, as such, accuracy of assembly of the cell frame to the insert may be enhanced. Accordingly, reduction in defect rate and achieving of mass production may be expected.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An elastomeric cell frame for a fuel cell, the elastomeric cell frame composing a unit cell of the fuel cell and comprising:
    an insert comprising:
        a membrane electrode assembly including a polymer electrolyte membrane and a pair of electrode layers respectively disposed, in a first direction, on opposite sides of the polymer electrolyte membrane; and
        a pair of gas diffusion layers disposed and bonded on upper and lower surfaces of the membrane electrode assembly, respectively; and
    an elastomeric frame disposed in an external region of the insert,
    wherein the elastomeric frame surrounds one of opposite edge surfaces of the insert and a side surface of the insert, the elastomeric frame being interface-bonded, through thermal bonding, to portions of the polymer electrolyte membrane and one of the electrode layers exposed at the one of opposite edge surfaces of the insert and the side surface of the insert, and
    wherein the elastomeric frame is composed of thermoplastic elastomer (TPE), which comprises a resin-based hard segment and a rubber-based soft segment,
    wherein both of the resin-based hard segment and the rubber-based soft segment are in direct contact with the membrane electrode assembly, and
    wherein each of the resin-based hard segment and the rubber-based soft segment included in a portion of the elastomeric frame are disposed to overlap both of the electrode layers in the first direction.

2. The elastomeric cell frame according to claim 1, wherein the elastomeric frame includes:
    an insert receiving hole in which the insert is disposed; and,
    at an internal peripheral surface thereof, a step surrounding one of opposite surfaces of the insert and the side surface of the insert,
    wherein the membrane electrode assembly further comprises:
        a first electrode layer disposed on one of the opposite surfaces of the polymer electrolyte membrane, the one surface of the polymer electrolyte membrane being seated on the step; and
        a second electrode layer disposed on the other surface of the polymer electrolyte membrane, and
    wherein the pair of gas diffusion layers comprises:
        a first gas diffusion layer bonded to the first electrode layer; and
        a second gas diffusion layer bonded to the second electrode layer.

3. The elastomeric cell frame according to claim 2, wherein, in the insert, a first edge surface of the polymer electrolyte membrane and an edge surface and a side surface of the first electrode layer contact the elastomeric frame,
    wherein a first thermal-bonded portion is disposed between the insert and the elastomeric frame,
    wherein the step and the edge surface of the first electrode layer contact each other and are thermally bonded to each other at the first thermal-bonded portion,
    wherein a second thermal-bonded portion is disposed between the insert and the elastomeric frame,
    wherein the step and the side surface of the first electrode layer contact each other and are thermally bonded to each other at the second thermal-bonded portion,
    wherein a third thermal-bonded portion is disposed between the insert and the elastomeric frame, and
    wherein the step and the first edge surface of the polymer electrolyte membrane contact each other and are thermally bonded to each other at the third thermal-bonded portion.

4. The elastomeric cell frame according to claim 3, wherein a side surface of the polymer electrolyte membrane in the insert contacts the elastomeric frame,
    wherein a fourth thermal-bonded portion is disposed between the insert and the elastomeric frame, and
    wherein the internal peripheral surface of the insert receiving hole and the side surface of the polymer electrolyte membrane contact each other and are thermally bonded to each other at the fourth thermal-bonded portion.

5. The elastomeric cell frame according to claim 3, wherein, a side surface of the second electrode layer in the insert contacts the elastomeric frame,
    wherein a fifth thermal-bonded portion is disposed between the insert and the elastomeric frame, and
    wherein the internal peripheral surface of the insert receiving hole and the side surface of the second electrode layer contact each other and are thermally bonded to each other at the fifth thermal-bonded portion.

6. An elastomeric cell frame for a fuel cell, the elastomeric cell frame composing a unit cell of the fuel cell and comprising:
an insert comprising:
a membrane electrode assembly including a polymer electrolyte membrane and a pair of electrode layers respectively disposed on opposite sides of the polymer electrolyte membrane; and
a pair of gas diffusion layers disposed and bonded on upper and lower surfaces of the membrane electrode assembly, respectively; and
an elastomeric frame disposed in an external region of the insert,
wherein the elastomeric frame surrounds one of opposite edge surfaces of the insert and a side surface of the insert, the elastomeric frame being interface-bonded, through thermal bonding, to portions of the polymer electrolyte membrane and one of the electrode layers exposed at the one of opposite edge surfaces of the insert and the side surface of the insert,
wherein the elastomeric frame includes:
an insert receiving hole in which the insert is disposed; and
at an internal peripheral surface thereof, a step surrounding one of opposite surfaces of the insert and the side surface of the insert,
wherein the membrane electrode assembly further comprises:
a first electrode layer disposed on one of the opposite surfaces of the polymer electrolyte membrane, the one surface of the polymer electrolyte membrane being seated on the step; and
a second electrode layer disposed on the other surface of the polymer electrolyte membrane,
wherein the pair of gas diffusion layers comprises:
a first gas diffusion layer bonded to the first electrode layer; and
a second gas diffusion layer bonded to the second electrode layer,
wherein, in the insert, a first edge surface of the polymer electrolyte membrane and an edge surface and a side surface of the first electrode layer contact the elastomeric frame,
wherein a first thermal-bonded portion is disposed between the insert and the elastomeric frame,
wherein the step and the edge surface of the first electrode layer contact each other and are thermally bonded to each other at the first thermal-bonded portion,
wherein a second thermal-bonded portion is disposed between the insert and the elastomeric frame,
wherein the step and the side surface of the first electrode layer contact each other and are thermally bonded to each other at the second thermal-bonded portion,
wherein a third thermal-bonded portion is disposed between the insert and the elastomeric frame,
wherein the step and the first edge surface of the polymer electrolyte membrane contact each other and are thermally bonded to each other at the third thermal-bonded portion,
wherein, in the insert, a second edge surface of the polymer electrolyte membrane and an edge surface and a side surface of the second electrode layer are exposed, and
wherein the elastomeric cell frame further comprises an elastomeric cover disposed between the elastomeric frame and the insert, the elastomeric cover being thermally bonded to the exposed second edge surface of the polymer electrolyte membrane, the exposed edge surface of the second electrode layer, and the exposed side surface of the second electrode layer while covering the exposed surfaces.

7. The elastomeric cell frame according to claim 6, wherein a sixth thermal-bonded portion is disposed between the elastomeric frame and the elastomeric cover, and
wherein the internal peripheral surface of the insert receiving hole and a side surface of the elastomeric cover contact each other and are thermally bonded to each other at the sixth thermal-bonded portion.

8. The elastomeric cell frame according to claim 7, wherein a seventh thermal-bonded portion is disposed between the insert and the elastomeric cover,
wherein the elastomeric cover and the second edge surface of the polymer electrolyte membrane contact each other and are thermally bonded to each other at the seventh thermal-bonded portion,
wherein an eighth thermal-bonded portion is disposed between the insert and the elastomeric cover,
wherein the elastomeric cover and the side surface of the second electrode layer contact each other and are thermally bonded to each other at the eighth thermal-bonded portion, and
wherein a ninth thermal-bonded portion is disposed between the insert and the elastomeric cover, and
wherein the elastomeric cover and the edge surface of the second electrode layer contact each other and are thermally bonded to each other at the ninth thermal-bonded portion.

9. The elastomeric cell frame according to claim 6, wherein the elastomeric cover includes a cover extension to cover a partial side surface of the second gas diffusion layer.

10. The elastomeric cell frame according to claim 1, wherein the elastomeric frame comprises:
a plurality of inlet manifold through-holes, through which reaction gas and coolant are introduced, at one side of the elastomeric frame; and
a plurality of outlet manifold through-holes, through which reaction gas and coolant are discharged, at another side of the elastomeric frame.

11. The elastomeric cell frame according to claim 1, wherein the elastomeric frame includes at least one protrusion seal on at least one of the upper or lower surfaces of the elastomeric frame, the at least one protrusion seal surrounding the insert along an external region of the insert.

12. The elastomeric cell frame according to claim 6, wherein the elastomeric cover is composed of a thermoplastic elastomer (TPE).

13. A unit cell for a fuel cell comprising:
an insert comprising a membrane electrode assembly which includes:
a polymer electrolyte membrane and a pair of electrode layers respectively disposed, in a first direction, on opposite surfaces of the polymer electrolyte membrane; and
a pair of gas diffusion layers respectively disposed on opposite surfaces of the membrane electrode assembly and being bonded to the membrane electrode assembly;
an elastomeric frame disposed to surround one of opposite edge surfaces of the insert and a side surface of the insert in an external region of the insert, the elastomeric frame being interface-bonded, through thermal bonding, to portions of the polymer electrolyte membrane and one of the electrode layers exposed at the one of opposite edge surfaces of the insert and the side surface of the insert; and a pair of separators respectively disposed at opposite surfaces of the elastomeric frame, to guide flow of reaction gas and coolant, wherein the elastomeric frame is composed of thermoplastic elastomer (TPE), which comprises a resin-based hard segment and a rubber-based soft segment, wherein both of the resin-based hard segment and the rubber-based soft segment are in direct contact with the membrane electrode assembly, and wherein each of the resin-based hard segment and the rubber-based soft segment included in a portion of the elastomeric frame are disposed to overlap both of the electrode layers in the first direction.

* * * * *